United States Patent
Eisenberg et al.

(10) Patent No.: US 10,091,461 B2
(45) Date of Patent: Oct. 2, 2018

(54) SYSTEM AND METHOD FOR REAL-TIME ADAPTATION OF A CONFERENCING SYSTEM TO CURRENT CONDITIONS OF A CONFERENCE SESSION

(71) Applicant: Polycom, Inc., San Jose, CA (US)

(72) Inventors: Aviv Eisenberg, Tel-Aviv (IL); Eran Decker, Givataeeim (IL); John Raymond Nicol, Framingham, MA (US); Michael Robert Tucker, Austin, TX (US)

(73) Assignee: Polycom, Inc., San Jose, CA (US)

( * ) Notice: Subject to any disclaimer, the term of this patent is extended or adjusted under 35 U.S.C. 154(b) by 97 days.

(21) Appl. No.: 14/512,186

(22) Filed: Oct. 10, 2014

(65) Prior Publication Data

US 2015/0103137 A1    Apr. 16, 2015

Related U.S. Application Data

(60) Provisional application No. 61/891,205, filed on Oct. 15, 2013.

(51) Int. Cl.
   *H04N 7/15* (2006.01)
   *H04L 29/06* (2006.01)
(52) U.S. Cl.
   CPC ......... *H04N 7/152* (2013.01); *H04L 65/1083* (2013.01); *H04L 65/403* (2013.01); *H04L 65/605* (2013.01); *H04N 7/157* (2013.01)
(58) Field of Classification Search
   CPC .................................................. H04N 7/152
   USPC ....................................................... 348/14.09
   See application file for complete search history.

(56) References Cited

U.S. PATENT DOCUMENTS

| | | | |
|---|---|---|---|
| 7,987,233 B1 | 7/2011 | Osborne et al. | |
| 9,113,030 B2* | 8/2015 | Ni | H04N 7/148 |
| 2006/0164508 A1* | 7/2006 | Eshkoli | H04N 7/147 |
| | | | 348/14.09 |
| 2006/0170762 A1* | 8/2006 | Tanaka | H04N 5/2624 |
| | | | 348/14.09 |
| 2006/0245378 A1* | 11/2006 | Jeong | H04Q 3/0045 |
| | | | 370/261 |

(Continued)

FOREIGN PATENT DOCUMENTS

EP    2334068    6/2011

OTHER PUBLICATIONS

European Search Report issued in co-pending EP Application No. 14189013.7 dated Feb. 25, 2015, 6 pages.

(Continued)

*Primary Examiner* — Creighton Smith
(74) *Attorney, Agent, or Firm* — Blank Rome, LLP (57) ABSTRACT

A system and method provide a rule-based technique for adapting a videoconferencing system to current conditions of a conference session, automatically converting the session from one conferencing technique to another, based on those current conditions. Rules may involve criteria including number of participants, ability to use a common codex, among others. An escalation module can be used to manage the transition between one type of conference session and another. If a condition occurs that causes transitioning the conference from one type to another, when that condition no longer applies, the conference may automatically transition back to the original conferencing type.

17 Claims, 5 Drawing Sheets

(56) References Cited

U.S. PATENT DOCUMENTS

| | | | |
|---|---|---|---|
| 2007/0223676 A1 | 9/2007 | Sasaki et al. | |
| 2008/0002818 A1* | 1/2008 | Kashimoto | H04L 12/1818 379/202.01 |
| 2009/0003248 A1 | 1/2009 | Shima et al. | |
| 2009/0213206 A1* | 8/2009 | Niu | H04N 7/147 348/14.09 |
| 2010/0194847 A1 | 8/2010 | Halavy | |
| 2010/0302958 A1* | 12/2010 | Wietfeldt | H04W 76/025 370/252 |
| 2011/0187813 A1* | 8/2011 | Musgrave | H04N 7/15 348/14.09 |
| 2011/0258338 A1* | 10/2011 | Vass | H04N 7/148 709/233 |
| 2011/0264666 A1* | 10/2011 | Gieseke | G06F 17/30321 707/741 |
| 2012/0076288 A1* | 3/2012 | Rodman | H04L 12/66 379/202.01 |
| 2013/0106989 A1 | 5/2013 | Gage et al. | |
| 2014/0219167 A1* | 8/2014 | Santhanam | H04W 28/0268 370/328 |
| 2014/0317183 A1* | 10/2014 | Shah | H04L 65/403 709/204 |
| 2014/0344169 A1* | 11/2014 | Phelps | G06Q 30/016 705/304 |
| 2016/0028790 A1* | 1/2016 | Eriksson | H04L 65/608 709/219 |
| 2016/0360155 A1* | 12/2016 | Civanlar | H04N 7/152 |

OTHER PUBLICATIONS

Taiwanese Office Action dated Dec. 29, 2015 filed in co-pending Taiwan Application No. 103135569, 14 pages.

European Examination Report dated Oct. 9, 2017 filed in co-pending EP Application No. 14189013.7, 7 pages.

Guidelines for Using the Multiplexing Features of RTP to Support Multiple Media Streams; Draft-IETF-Avtcoremultiplex-Guidelines-01.Txt, Internet Engineering Task Force, IETF; Standardworkingdraft, Internet Society (ISOC) 4, Rue Des Falaises CH—1205, Jul. 15, 2013, pp. 1-46.

Web Real-Time Communication (WEBRTC): Media Transport and Use of RTP; Draft-IETF-RTCWEB-RTP-Usage-07.Txt, Internet Engineering Task Force, IETF; Standardworkingdraft, Internet Society (ISOC) 4, Rue Des Falaises Ch—1205 Geneva, Switzerland, Jul. 15, 2013, pp. 1-61.

* cited by examiner

SYSTEM AND METHOD FOR REAL-TIME ADAPTATION OF A CONFERENCING SYSTEM TO CURRENT CONDITIONS OF A CONFERENCE SESSION

FIELD OF THE DISCLOSURE

The present disclosure relates to videoconferencing and more particularly to the field of adapting from one conferencing technique to another, based on current conditions of a videoconferencing session.

BACKGROUND

As everyday applications and services migrate to Internet Protocol (IP) networks at a remarkable rate, and the variety of multimedia conferencing equipment continues to grow, more and more people rely on multimedia conferencing as an important communication method. Today, multimedia conferencing communication can be implemented using a plurality of conferencing techniques. A few examples of conferencing techniques include a legacy multimedia conferencing method, a media relay conferencing method, and a mesh conferencing method. In this disclosure, the terms multimedia conference, video conference (with or without content) and audio conference may be used interchangeably and the term video conference is used as a representative term of video, audio, and multimedia conferences.

A legacy multipoint conference between three or more participants requires a Multipoint Control Unit (MCU). Such an MCU is a conference controlling entity that is typically located in a node of a network or in a terminal that receives several channels from a plurality of endpoints. According to certain criteria, the legacy MCU processes audio and visual signals and distributes them to each of the participating endpoints via a set of connected channels. Examples of legacy MCUs include the RMX 2000®, which is available from Polycom, Inc. (RMX 2000 is a registered trademark of Polycom, Inc.) A terminal in the legacy-communication method, which may be referred to as a legacy endpoint (LEP), is an entity on the network, capable of providing real-time, two-way audio and/or audio visual communication with another LEP or with the MCU. A more thorough definition of an LEP and an MCU can be found in the International Telecommunication Union ("ITU") standards, such as, but not limited to, the H.320, H.324, and H.323 standards, which can be found at the ITU Website, www.itu.int.

A common MCU, referred to also as a legacy MCU, may include a plurality of audio and video decoders, encoders, and media combiners (audio mixers and/or video image builders). The MCU may use a large amount of processing power to handle audio and video communication between a variable number of participants (LEPs). The communication can be based on a variety of communication protocols and compression standards and may involve different types of LEPs. The MCU may need to combine a plurality of input audio or video streams into at least one single output stream of audio or video, respectively, that is compatible with the properties of at least one conferee's LEP to which the output stream is being sent. The compressed audio streams received from the endpoints are decoded and can be analyzed to determine which audio streams will be selected for mixing into the single audio stream of the conference. The terms decode and decompress are used herein interchangeably.

A conference may have one or more video output streams wherein each output stream is associated with a layout. A layout defines the appearance of a conference on a display of one or more conferees that receive the stream. A layout may be divided into one or more segments where each segment may be associated with a video input stream that is sent by a certain conferee via the LEP. Each output stream may be constructed of several input streams, resulting in a continuous presence (CP) image. In a CP conference, a user at a remote terminal can simultaneously observe several other participants in the conference. Each participant may be displayed in a segment of the layout, and each segment may be the same size or a different size. The choice of the participants displayed and associated with the segments of the layout may vary among different conferees that participate in the same session.

The second type of communication method is Media Relay Conferencing (MRC). In MRC, a Media Relay MCU (MRM) receives one or more streams from each participating Media Relay Endpoint (MRE). The MRM relays to each participating endpoint a set of multiple media streams received from other endpoints in the conference. Each receiving endpoint uses the multiple streams to generate the video CP image according to a layout, as well as mixed audio of the conference. The CP video image and the mixed audio are played to the MRE's user. An MRE can be a terminal of a conferee in the session that has the ability to receive relayed media from an MRM and deliver compressed media according to instructions from an MRM. A reader who wishes to learn more about an MRC, MRM, or an MRE is invited to read U.S. Pat. Nos. 8,228,363 and 8,760,492, both of which are incorporated herein by reference in their entirety. As used herein, the term endpoint may represent either an LEP or an MRE.

In some MRC systems, a transmitting MRE sends its video image in two or more streams; each stream can be associated with different quality level. The qualities may differ in frame rate, resolution and/or signal to noise ratio (SNR), etc. In a similar way, each transmitting MRE may send its audio in two or more streams that may differ from each other by the compressing bit rate, for example. Such a system can use the plurality of streams to provide different segment sizes in the layouts, different resolutions used by each receiving endpoint, etc. Further, the plurality of streams can be used for overcoming packet loss.

MRC is becoming increasingly popular today. Many videoconferencing systems deliver a plurality of quality levels in parallel within one or more streams. For video, for example, the quality can be expressed in a number of domains, such as temporal domain (frames per second, for example), spatial domain (HD versus CIF, for example), and/or in quality (sharpness, for example). Video compression standards, for example, that can be used for multi quality streams are H.264 AVC, H.264 annex G (SVC), MPEG-4, etc. More information on compression standards such as H.264 can be found at the ITU Website www.itu.int, or at www.mpeg.org.

In the first two types of communication methods, the legacy MCU and the MRC, a central entity is needed to handle the signaling and the audio and video media streams (an MCU or an MRM, respectively). Each endpoint sends its media streams to an MCU or an MRM. The MCU or the MRM processes the media stream according to the type of the communication method being applied and transfers the relevant streams to receiving endpoints. The term MCU is used herein as a representative term for an MRM and a legacy MCU.

A third type of communication method can be used. The third method can be referred to as a mesh conferencing system (MCS). In an MCS, there is no central entity for handling the media streams. Instead, in an MCS a Roster List Server (RLS) can be used as the central signaling entity and clients can send and receive the media directly from each other. In an example of an MCS, a client can use a WebRTC application program interface (API). The WebRTC was drafted by the World-Wide-Web consortium (W3C) for facilitating browser-to-browser real-time communication (P2P) of audio, video, and data sharing. A common WebRTC may use a VP8 codec for video and an OPUS codec for audio. VP8 is a video compression format owned by Google Inc. Opus is a lossy audio codec developed by the Internet Engineering Task Force (IETF). The WebRTC and the compression format VP8 are currently supported by browser applications such as, but not limited to, Google CHROME® (CHROME is a registered trademark of Google Inc.); Mozilla FIREFOX® (FIREFOX is a registered trademark of Mozilla Foundation); OPERA® (OPERA is a registered trademark of Opera Software ASA). Some browsers may need a plug-in in order to use WebRTC and the VP8 codec. Other MCS may use other Web clients and other compression standards in order to deliver mesh conferencing services.

A common RLS can hold a directory of a plurality of virtual meeting rooms (VMR). Each VMR can represent a videoconferencing session and it may be associated with a VMR identification (VMRID) with or without a password. In some MCS, each VMR may have a different uniform resource locator (URL) or uniform resource identifier (URI). Further, a VMR may comprise a list of endpoints that are already connected to the VMR. In the list, each endpoint is associated with one or more URLs that allow other participants to contact the VMR. Each URL can be associated with a media type or signaling. In a common MCS, the RLS list, which is also referred as an RTS state table, is created in real time starting from the first conferee that calls the VMR and is updated each time a new conferee joins the VMR or a current conferee leaves the VMR. A non-limiting example of an RLS is www.Vline.com.

When a user wishes to participate in a mesh videoconferencing session, the user may use a Web client to contact a virtual meeting room in an RLS, using a browser application and clicking on the URL provided in the meeting invitation. The RLS may start an authentication process and, upon completion, an HTML5 file can be downloaded to the browser application. The browser application can parse the HTML5 file and download a list of URLs of the users that are already associated with that virtual meeting room. In addition, a JavaScript RLS Web client (RLSWC) can be deployed from the RLS to the requesting browser application such as Google Chrome, Mozilla Firebox, or Opera Mobile, for example. The RLSWC can comprise a logical module that is needed for establishing the real-time session. When the RLSWC is employed by a processor that runs the browser application, the processor can establish the signaling and control connections with the other browser applications and conduct the mesh videoconferencing.

In some cases, the RLS may also transfer a VMR state table to the new conferee. The VMR state table can include information on the peers that are already participating in the video session. Then, the new conferee needs to establish a videoconferencing session with each other conferee's endpoint by establishing a signaling and control connection. The system can be based on Session Initiation Protocol (SIP) or H.323, for example. Then each endpoint needs to establish one or more SRTP/IP and SRTCP/IP connections for sending its video image and audio stream to each of the other participating endpoints and for receiving video image and audio stream from each of the other participating endpoints. SRTP stands for Secure Real-Time Transport Protocol and SRTCP stands for Secure Real-Time Control Protocol. Each time a conferee leaves the session, the RLS can update the VMR state table accordingly. An updated copy of the VMR state table can be supplied to each of the currently connected conferees informing them on the latest change. In some cases, the entire updated VMR state table is sent. In other cases, only the changes are sent. Thus, in an MCS, no central entity receives or transmits media streams to and from the participating endpoints.

A reader who wishes to learn more about videoconferencing standards and protocols is invited to visit the ITU Website, www.itu.int, or the Internet-Engineering-Task Force (IETF) Website, www.ietforg. Legacy multipoint conference systems, MRCs, MCSs, MCUs, RLSs, LEPs, MREs, Web conferencing clients, and VMRs are well known to a person with ordinary skill in the art and have been described in many patents, patent applications, and technical books. As such, these will not be further described. The following are examples of patents and patent publications that describe videoconferencing systems: U.S. Pat. Nos. 6,496,216, 6,757,005, 7,174,365, 7,085,243, 8,411,595, 7,830,824, 7,542,068, 8,340,271, and 8,228,363; and U.S. Pat. Pub. No. 20140028788, and others.

A conventional MCS suffers from certain limitations. One such limitation centers on bandwidth. When three endpoints participate in a mesh videoconferencing session, each endpoint transmits two audio streams and two video streams, one set to each of the other endpoints and receives two audio and two video streams, one set from each of the other endpoints. In general, a full mesh conference with N participants requires N(N−1)/2 peer sessions per medium type. The $N^2$ property quickly renders a full mesh conference impractical for anything exceeding a modest N. The required bandwidth for such amount of real time data may be close to the limits of the available bandwidth of an endpoint. Any additional conferee may exceed the available bandwidth. Thus, any additional request to join the session can be denied or the quality of the compression can be reduced, reducing the number of frames per second, sharpness, etc. This could result in seriously reduced quality of experience for such conferees.

Another limitation of a conventional MCS can be the endpoint capabilities. For example, a conventional MCS requires that all the endpoints be able to use the same compression format such as, but not limited to, VP8. If one of the endpoints cannot satisfy this requirement, that endpoint cannot send or receive video data directly from the other endpoints.

BRIEF DESCRIPTION OF THE DRAWINGS

Embodiments of the present invention will be understood and appreciated more fully from the following detailed description, taken in conjunction with the drawings in which.

DETAILED DESCRIPTION OF EMBODIMENTS

The deficiencies of a conventional MCS described above are not intended to limit the scope of the inventive concepts of the present disclosure in any manner. The deficiencies are presented for illustration only. The disclosure is directed to a novel technique for transitioning automatically from one videoconferencing type to another according to current conditions of the session.

An example embodiment of the novel technique can have a list of conditions or rules for using a certain conferencing system and a list of rules for moving from one conferencing system to another. The list of rules can be embedded in the HTML file that is downloaded when the browser requests the URL of the VMR. The following are a few examples of rules for when an MCS can be used. One rule can be the number of conferees is less than a certain configurable limit number, where the configurable limit number can be in the range of three to six conferees, for example. Another rule can be all endpoints can use the same encoding/decoding protocol, VP8 for example. Yet a third rule can be all endpoints can run the relevant RLSWC that is capable of participating in a mesh videoconferencing session, etc. The following are a few examples of rules for deciding when an MCU can be used. A first rule can be the number of conferees is above a certain limit number. A second rule can be different endpoints using different compression standards.

Examples of rules for moving from MCS to MRC can include a new conferee would like to join the videoconferencing session. If the number of conferees, including the new conferee, exceeds the capability of the relevant MCS. instead of rejecting the new conferee or reducing the quality of the session, the session can be moved to an MRC. A new session can be initiated in the background using an MRM, while the mesh videoconferencing between the previous conferees continues. When the MRM completes establishing of the MRC, the relevant endpoints can automatically switch to the MRM and start rendering the CP video image and mixed audio created from the video and the audio streams that are obtained from the MRM. Each endpoint may then terminate the MCS session by disconnecting the peer-to-peer media and control connections with each other. In parallel, the MRM can notify the RLS that the MRM would like to join the VMRID. Thus, when any additional conferee calls the RLS and send a join request, the new endpoint may get a join notification with an updated VMR state table that includes the MRM. In response, the new endpoint will automatically connect to the MRM for joining the video session by using the VMRID. Another example rule for moving from an MCS to an MRC or a legacy conference is when one of the conferees is connected via a bad connection that causes a large number of missing packets. The problem session can be switched from an MCS to an MRC or a legacy MCU.

Another rule from moving from one type of conferencing to another, for example from an MCS or an MRM into a legacy conferencing system is when a new participant's endpoint cannot use the same compression format as the others, such as an endpoint that cannot use VP8 while the others use VP8 as the compression format. Another example of rule can be when an endpoint does not have the computing capacity for handling a plurality of streams of audio and/or video from a plurality of endpoints and decoding and mixing into mixed audio and/or building a CP video image, respectively. In such a case, an MRC or an MCS session may move to a legacy videoconferencing system and use an MCU. The new conferee's endpoint can call the MCU using the VMRID and start the videoconferencing session over the MCU.

In a similar way to the technique that is disclosed above, the session over the MCU can be established in the background while the mesh videoconferencing or the media-relay videoconferencing between the earlier conferees continues. When the legacy session is established and can be initiated, the MCU can be configured to send a join request with the VMRID to the RLS. The RLS can respond with a join notification that can be associated with an updated VMR state table including the MCU as a new conferee. In parallel, the updated VMR state table can be sent to each one of the earlier-conferees' endpoint. The earlier conferees' endpoints can then automatically switch to the MCU and start rendering CP video image and mixed audio which are obtained from the MCU. Next, each earlier conferee's endpoint may terminate the MCS or the MRC session by disconnecting the media and control connections with each of the other endpoints or the MRM. Where the MRM was previously used, the MRM can be configured to send a leave indication to the RLS informing the RLS that the MRM is disconnected from the mesh videoconferencing session. In response, the MRM is removed from the VMR state table and an updated VMR state table can be sent to all the conferees that are currently connected via the VMRID.

In some embodiments, an RLSWC that is employed by an endpoint can be configured to include an escalation module that manages the escalation procedure. The escalation module can be an integral part of an RLSWC, and the module can be downloaded to the Web browser together with the RLSWC. Software of an escalation module may be embodied on a computer readable medium such as a read/write hard disc, CDROM, Flash memory, ROM, or other memory or storage, etc. In order to execute the escalation procedure, the software program may be loaded to an appropriate processor as needed. An example escalation module can be configured to comprise a list of rules regarding which videoconferencing type to use and a list of rules indicating when to move from one type of videoconferencing system to the other.

An example VMR can be associated with two or more central entities, RLS, MRM, or MCU, by using an ID-table. The ID-table can comprise the URL of each central entity, the VMRID at each entity, with or without a password to be used at each central entity. In some embodiments, the VMR may have a single ID number with a single password that can be used while communicating with the two or more central entities. In addition, an example MRM and an MCU that can serve the same VMR can be configured to inform the RLS each time that one of them is requested to handle the session or is disconnected from the session; in a similar way, a common RLSWC can inform the RLS. Further, each escalation-module can be configured to identify when an MRM or an MCU is connected to the VMR.

In response to the MRM or MCU request to join the session, the RLS may send an updated VMR state table informing the earlier conferees that the MCU or the MRM joined the session. Upon receiving such an updated VMR state table, an embodiment of the escalation-module at the earlier conferee's endpoint can be configured to call the MRM or MCU, and start joining the videoconference that is associated with that VMRID. After establishing the signaling and control connections, the SRTP/IP and the SRTCP/IP connections for carrying the audio and video to and from the MRM or MCU, that endpoint can disconnect the media connections with the other earlier conferees' endpoints. Thus, the conferencing session was moved from MCS to MRC or legacy session, respectively.

In some embodiments, an escalation module can be configured to capture the reason for moving from one conferencing type to another. The reason can be stored and used later. Upon determining that the original reason for the escalation no longer applies, one embodiment of the escalation-module may return to an MCS. For example, if the reason for the escalation is "the number of conferees is above the configured limit," when the number of conferees returns below the configured limit, the remaining endpoints can return from MRC or legacy conferencing to MCS.

If the escalation was to legacy videoconferencing, then the escalation-module of an earlier conferee's endpoint can be configured to identify which endpoints are already connected to the VMR at the MCU and compare those endpoints to the ones that were connected to the MCS. The endpoints that were not connected to the MCS can be referred to as the reason for the escalation. If those endpoints disconnect from the session the escalation module can return to the MCS or MRC for example.

In some embodiments, the escalation-module can be embedded in an RLS. In such an embodiment, the RLS can manage the escalation process and inform the participants' endpoints to move from one communication type to the other.

Turning now to the figures, in which like numerals represent like elements throughout the several views, embodiments of the present disclosure are described. For convenience, only some elements of the same group may be labeled with numerals. The purpose of the drawings is to describe example embodiments and not for production. Therefore, features shown in the figures are chosen for convenience and clarity of presentation only. It should be noted that the events along the time diagram are not drawn to scale. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

Figure 1:
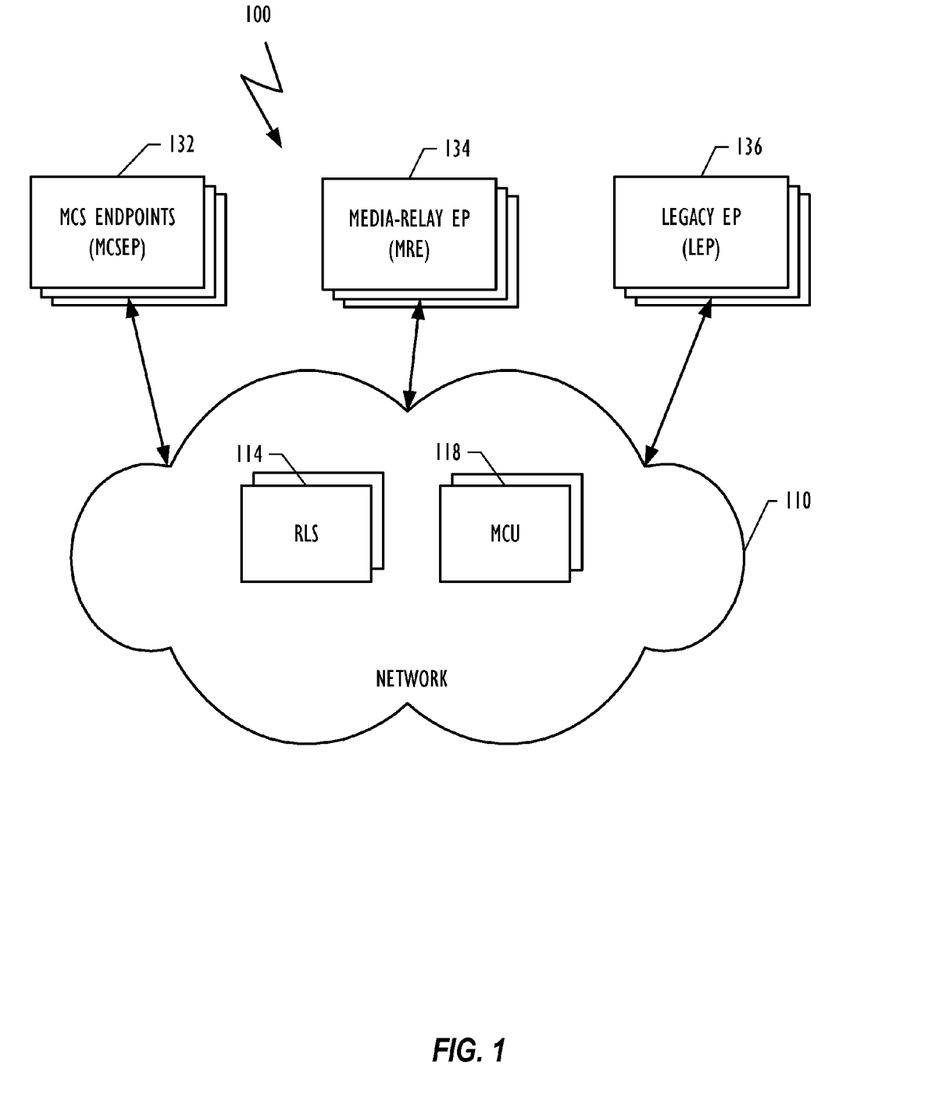
FIG. 1 illustrates a multimedia multipoint conferencing system 100 comprising a variety of electronic videoconferencing endpoints, according to one embodiment.

FIG. 1 illustrates a novel multimedia conferencing system 100, according to one embodiment. System 100 can comprise a network 110, one or more RLSs 114, one or more MCUs 118, a plurality of MCS endpoints (MCSEPs) 132, a plurality of MREs 134, and a plurality of LEPs 136. Network 110 can be, but is not limited to, a packet switched network, a circuit switched network, an IP network, or any combination thereof. The multimedia communication over the network can be based on protocols such as, but not limited to, H.320, H.323, SIP, HTTP, HTML5, SDP, and may use media compression standards such as, but not limited to, H.263, H.264, VP8, G.711, G.719, and Opus. HTTP stands for Hypertext Transfer Protocol and HTML stands for Hypertext Markup Language.

An example of RLS 114 can be a Web server that can communicate with a plurality of computing devices over the network 110 by using common HTTP. RLS 114 can store a plurality of VMR files. Each file can be associated with a VMRID and have a URL that indicates the VMRID.

In some embodiments, the VMR HTML5 file may include: a list of rules for moving from one conferencing technique to another, a VMR state table that includes the URL of all the elements of MCSEP 132 that are currently connected to the session, information about the windows in which to place the video images that will be obtained from the MCSEP 132 that will be connected to the VMRID, a link to an RLS JavaScript application, and a link to another JavaScript application that can handle SIP signaling for communicating with MCU 118. This JavaScript application can be referred as a SIP JavaScript application. Some embodiments of RLS 114 may be configured to send an updated VMR state table to all participating MCSEP 132, which are already connected to the VMR, when a new MCSEP 132 is connected to the VMR or when a conferee leaves the VMR.

In one embodiment of an RLS JavaScript application, the RLS JavaScript application, when is executing by a browser application, can be configured to call on a WebRTC API to establish an RTC session with another WebRTC peer according to the VMR state table. The WebRTC APIs and underlying capabilities are supported natively within the browser (eliminating the performance overhead and security issues associated with downloading plug-ins and the like). The WebRTC client can handle the media to and from the other clients comprising MCSEP 132.

In addition the RLS JavaScript application can be configured to check the current condition of the conferencing session, compare it to the list of rules and accordingly can adapt from one conferencing system method to another, adapting the conferencing technique in real-time in accordance with the current conditions of the session. Some embodiments of the RLS JavaScript application can be configured to identify an MCU that is connected to the VMR. In some embodiments, the URL of the MCU in the VMR state table can include a representative for the MCU.

MCSEP 132 can be any computing device having wire or wireless communication capabilities over network 110. An example MCSEP 132 can be a laptop computer, a notebook, a smartphone, a tablet, a touch-screen phone, etc. An example MCSEP 132 can participate in a mesh videoconferencing session over the network 110 by using, for example, a browser application having the WebRTC API or having another API with similar capabilities. Browser applications such as, but not limited to, Google CHROME®, Mozilla FIREFOX®, and OPERA®, can be used.

A user of an MCSEP 132 may receive an invitation to join a conferencing session that is conducted via a VMR. The invitation can be an email with a link (typically a URL) to a certain VMR. The link can point to the RLS 114 as well as the VMRID that is used to identify the VMR. Upon clicking on the link, the user activates the browser application that sends a fetch request to the RLS 114 requesting the HTML5 file that is associated with the URL, the VMR HTML file. The received VMR HTML file can be parsed by the browser, and upon activating the link to the RLS JavaScript application, the JavaScript application can be downloaded and activated. The RLS JavaScript application can comprise JavaScript code as well as HTML5 code. When the browser activates the JavaScript application and continues parsing the HTML file, it may store the list of rules for moving from one conferencing technique to another, the VMR state table, an ID of the MCU 118 that is associated to that VMRID, etc. Then the RLS JavaScript application can call the Web-client, such as, but not limited to, WebRTC for setting the media connections with the other peers. Although described herein in terms of JavaScript, other scripting languages can be used.

Some embodiments of a RLS JavaScript application may be further configured to determine when to switch from one conferencing technique to another. The decision can be based on the list of rules. When the RLS JavaScript application determines to switch to a legacy conferencing technique and to invite an MCU 118 to conduct the session, a SIP-capable JavaScript application can be downloaded from RLS 114 and activated for inviting the MCU 118. In some embodiments, the SIP JavaScript application can be part of the RLS JavaScript application. In yet other embodiments, the SIP JavaScript application can be embedded in the HTML5 file. More information on the operation of the RLS JavaScript application is disclosed below in conjunction with FIG. 3 and FIG. 4.

An example MCU 118 can be configured to include elements of common MCU for conducting legacy CP videoconferencing between a plurality of LEPs 136. In addition, MCU 118 can have an MRE interface module for communicating with one or more MREs 134. Further, embodiments of an MCU 118 can be configured to include an MCSEP interface module for communicating with one or more MCSEPs 132.

The MCU 118 can be configured to respond to a first SIP invitation to join a VMRID, received from an MRE 134 or a LEP 136, by establishing a CP video conference for handling the VMRID. In addition, the MCU 118 can be configured to send an indication to the RLS 114 that it joins the VMRID. In response, the RLS 114 can update the VMR state table with the URL of the MCU 118 and send it to all earlier participants associated with MCSEP 132 that are already connected to the VMRID. More information on the operation of MCU 118 is disclosed in FIGS. 2-4.

The LEP 136 and the MRE 134 can have similar functionality as conventional LEPs and MREs respectively. Each type of endpoint can be configured to call the MCU 118 upon reception of an invitation to join a VMR.

Figure 2:
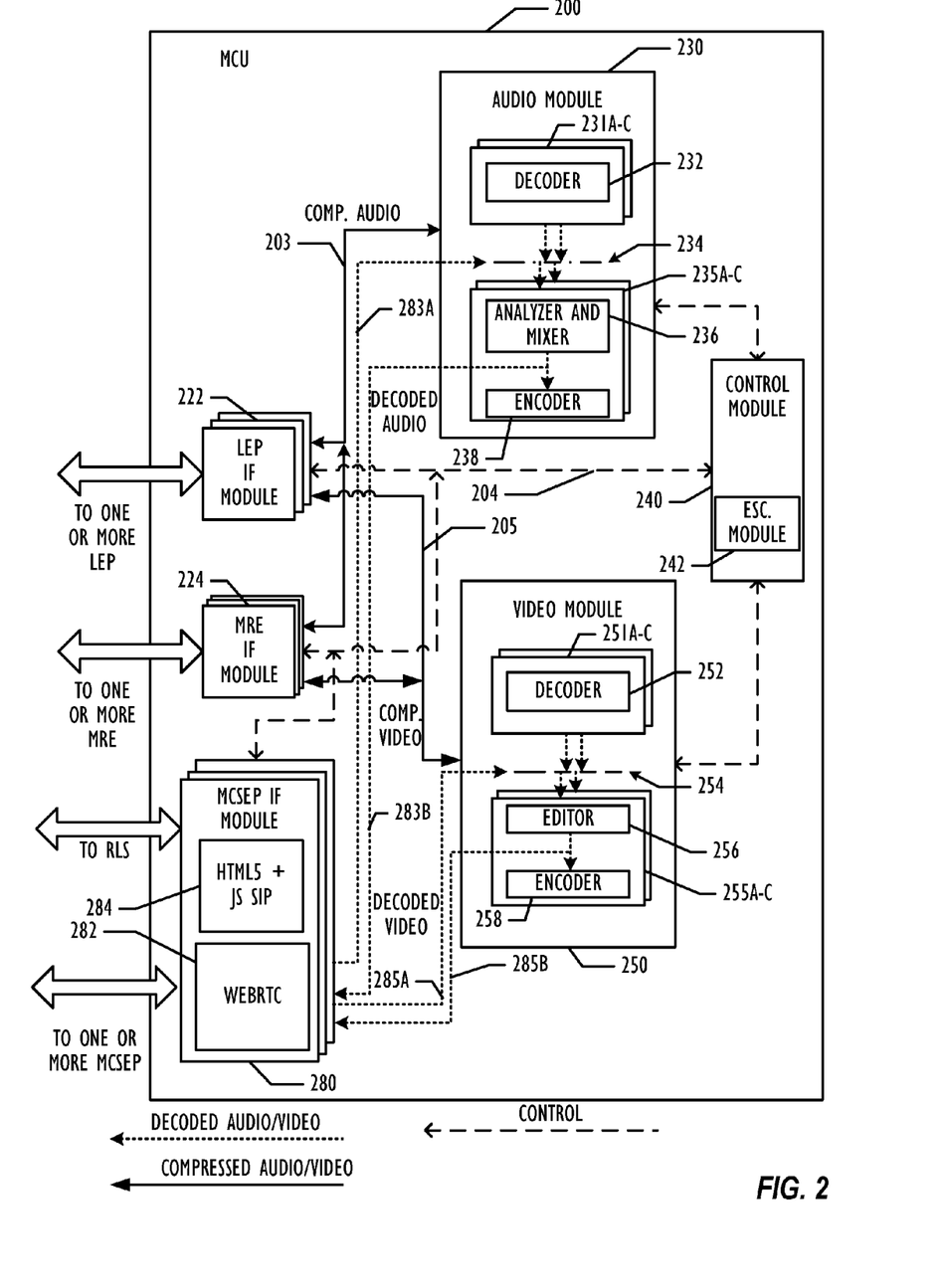
FIG. 2 depicts a block diagram with relevant elements of an example embodiment of an MCU, according to one embodiment.

FIG. 2 depicts a block diagram with relevant elements of one embodiment of an MCU 200 that is configured to enable moving from one conferencing technique to another. MCU 200 may comprise one or more LEP interface modules 222 for communicating with a plurality of LEPs 136, one or more MRE interface modules 224 for communicating with a plurality of MREs 134, and one or more MCSEP interface modules 280 for communicating with a plurality of MCSEPs. In addition, the MCU 200 can comprise an audio module 230, a video module 250, and a control module 240.

The MCSEP interface modules 280 comprise HTML5 and JavaScript modules 284 and WebRTC modules 282. Audio module 230 includes compressed audio input modules 231A-C, each of which includes a decoder 232, which takes compressed audio, decodes it and provides decoded audio to common interface bus 234. Output audio modules 235A-C each include an analyzer and mixer 236 and an encoder 238 for providing compressed mixed audio. Video module 250 comprises compressed input video modules 251A-C, each of which includes a decoder 252, for decoding compressed video, placing the decoded video on common interface bus 254. Video module 250 also comprises output video modules 255A-C, which include an editor 256 and encoder 258 for providing compressed video.

Control module 240 may include an escalation module 242 for controlling the operation of the internal modules of the MCU 200 during the escalation process as it is disclosed below in conjunction with FIG. 3 from T16.

Link 203 connects the LEP interface modules 222 to the audio module 230, providing compressed audio. Links 283a connect the MCSEP interface modules 280 to the audio module 230, providing decoded audio. Links 283b connect the decoded mixed audio bus 234 from the audio module 230 to the MCSEP interface modules 280 providing decoded mixed audio to the relevant MCSEP 132. Links 204 provide control links between the control module 240 and the LEP, MRE, and MCSEP interface modules 222, 224, and 280. Links 285a provide decoded video, connecting the MCSEP interface modules 280 to the video module 250 providing decoded video. Links 285b connect the editor 256 of the video module 250 to the MCSEP interface modules 280 providing decoded CP video images to the relevant MCSEP 132. Links 205 provide compressed video, connecting video modules 250 with LEP and MRE interface modules 222 and 224.

The LEP interface modules 222 provide network connections to one or more LEP 136 via MCUs 118, while the MRE interface modules 224 provide network connections to one or more MREs 134, and MCS interface modules 280 provide network connections to one or more MCSEPs 132 and RLS 114. Common operation of LEP IF Modules 222, MRE IF Modules 224, audio modules 230, and video modules 250, are well known to a person with ordinary skill in the art and will not be further discussed. In addition, common operations such as HTTP, secure real time protocol (SRTP) etc, of HTML5+JS SIP module 284 and WEBRTC module 282 are well known and will not be further discussed.

Figure 3:
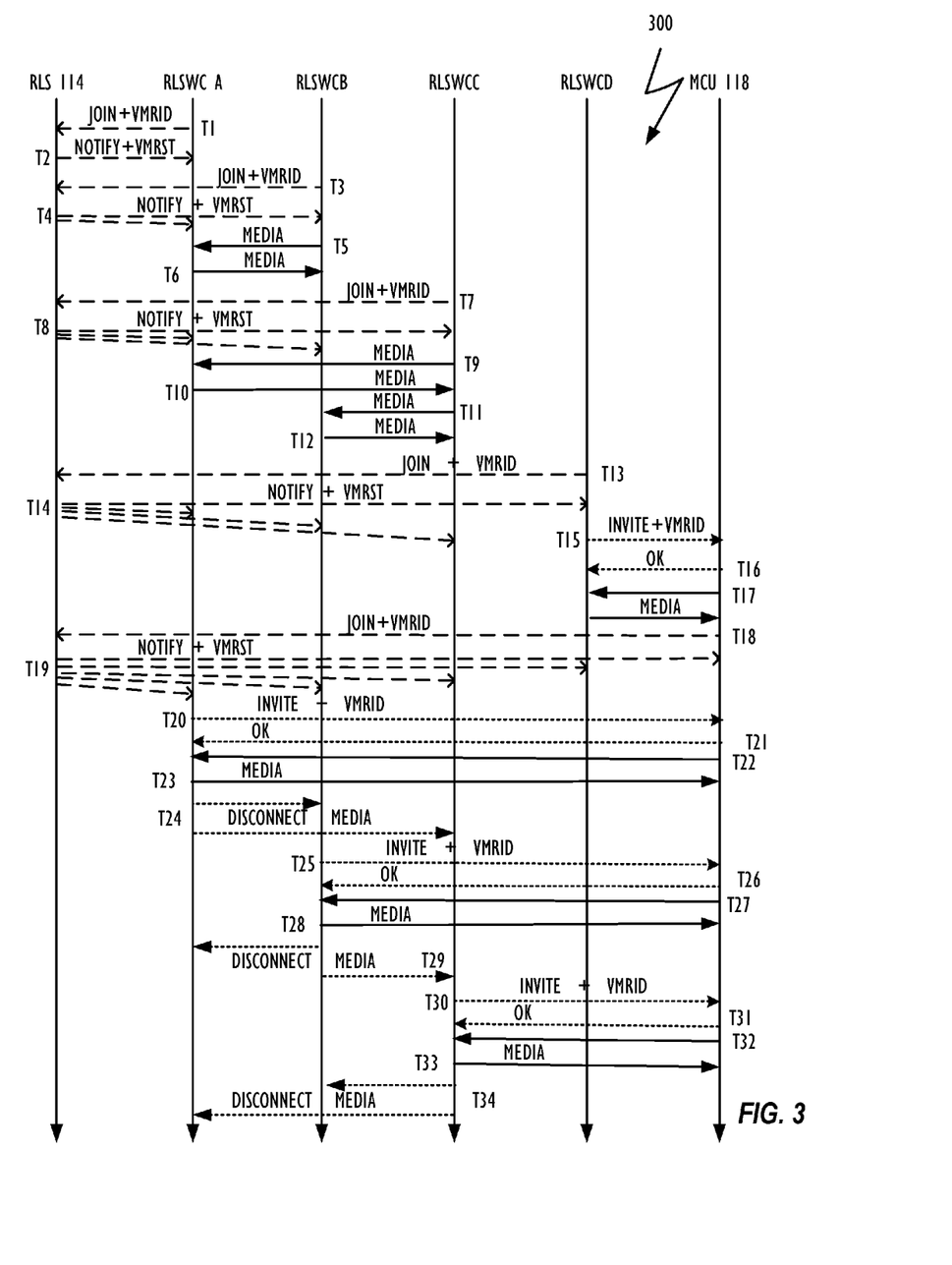
FIG. 3 is timing diagram of relevant events in a mesh-conferencing session with escalation.

FIG. 3 illustrates a timing diagram 300 of relevant events while conducting a VMR, converting a mesh conference to a legacy conference. At T0 (not shown), the VMRID is initiated. Between T1 and T12, the session is handled by using MCS techniques between three RLSWCs executed by three MCSEPs 132. At T1, a join request for the VMRID is send from RLSWC A to the RLS 114, which responds at T2 with the VMR state table. Similarly, at T3, RLSWC B requests to join the conference identified by the VMRID. Then at T4, RLSWC A and RLSWC B receiving the updated VMR state table at T4. Media connections between RLSWCs A and B are made at T5 and T6. Similarly, T7-T12 indicate a third endpoint RLSWC C joining the conference at the VMR.

At T13, a $4^{th}$ RLSWC D would like to join the session, which causes the VMR session to move to the MCU 118 as illustrated by the arrows from T14 to T34. At T14, the RLS 114 sends the updated VMR state table to all four participants. At T15, RLSWC D invites the MCU 118 to join the conference, which MCU 118 accepts at T16, establishing media connections with RLSWC D at T17.

MCU 118 then requests joining the conference by sending the VMRID to RLS 114 at T18, causing the RLS 114 to send updated VMR state tables to RLSWCs A-D and MCU 118 in T19. In T20-T23, RLSWC A connects to MCU 118 and begins media communications, before dropping the connection to RLSWCs B and C in T24. Similarly, RLSWC B connects to MCU 118 in T25-T28, dropping connections with RLSWCs A and C in T29. Finally, RLSWC C connects to MCU 118 in T26-T33, disconnecting from RLSWC A and B in T34. The mesh conference has now become a legacy conference.

Figure 4A:
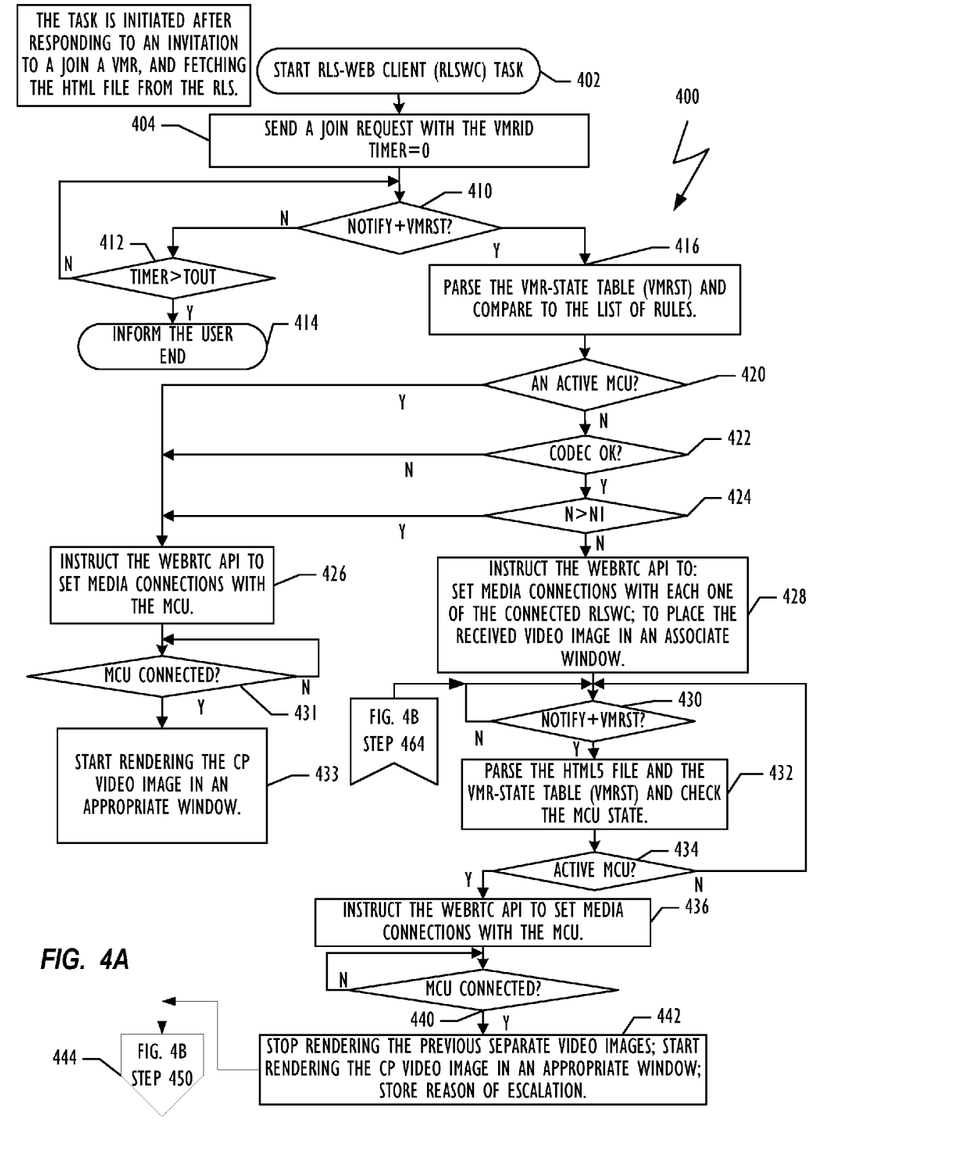
FIGS. 4A&B is a flowchart illustrating relevant actions of an RLSWC for adapting the conferencing technique to the current needs of a session.
Figure 4B:
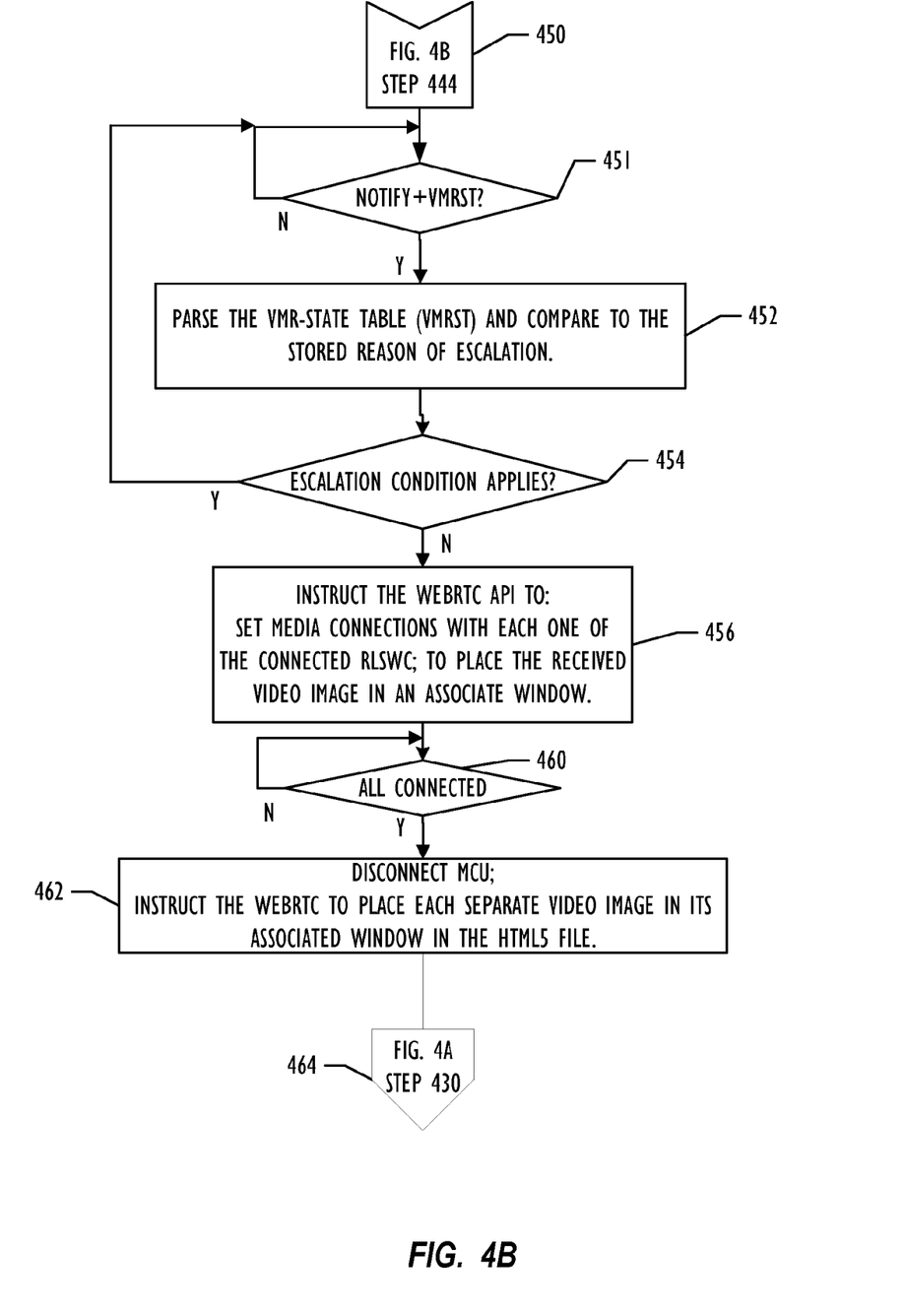

FIGS. 4A and B illustrate a flowchart with relevant actions of an example technique 400 that can be executed by the RLSWC, which is executed by the MCSEPs 132, during moving from one conferencing technique to another. In other embodiments, technique 400 can be executed by RLS server 114. In some embodiments, part of the technique can be implemented by the escalation module 242, such as the actions that deal with terminating the escalation process.

Actions 402 to 424 illustrates the actions that an example of an RLSWC can execute upon receiving an updated VMR state table for determining whether to change the conferencing technique.

In block 402 the RLSWC task begins. In block 404, a join request is sent with the VMRID, resetting a timer. In block 410, a determination is made whether a VMR state table is received. If not, if the timer exceeds a timeout threshold in block 412, the user is informed in block 414 that the request to join did not succeed. If the timer does not exceed the threshold, the task returns to block 410.

If the VMR state table is received, then in block 416, the VMR state table is parsed and compared, in blocks 420 to 424, to the list of rules. If an active MCU is in use (420) or the codec does not match the codec of the other endpoints (422), or the number of conferees N exceeds a limit value N1 (424), then in block 426 the WebRTC API is instructed to set media connections with the MCU. Actions 426 to 444 illustrate moving the technique from an MCS to an MCU. In block 431, the task waits until the MCU is connected, then in block 433 starts rendering the CP video image in an appropriate window or segment of the layout, before proceeding to block 450 of FIG. 4B.

If an MCU is not connected (420), all codecs are matched (422), and N is smaller than N1 (424), then in actions 428 to 442, the session remains operating as an MCS. In block 428 the WebRTC API is instructed to make mesh connections with each connected RLSWC and to place the received video image in an associated window. In block 430, the task waits to receive another VMR state table. Upon receipt, in block 432 the HTML5 file and VMR state table is parsed and the state of the MCU is checked. If no active MCU is found in block 434, the task returns to wait for another VMR state table. If an active MCU is found in block 434, in block 436 the WebRTC API is instructed to make media connections with the MCU, waiting in block 440 until the MCU is connected. Upon connection, in block 442 the RLSWC stops rendering the previous separate video images and starts rendering the CP video image from the MCU in an appropriate window. In some embodiments, the reason for escalation is also stored. The task in block 444 then proceeds to block 450 of FIG. 4B.

Actions 450 (FIG. 4B) to 464 illustrate actions that can be implemented when moving from an MCU back to an MCS. Entering in block 450, the task waits for another VMR state table in block 451. In block 452, the VMR state table is parsed and compared to the stored reason for escalation. If the escalation condition still applies (454), the task returns to wait for another VMR state table in block 451. If the escalation condition no longer exists, in block 456 the WebRTC API is instructed to start making mesh connections with each connected RLSWC, placing the received video images in an associated window.

After waiting in block 460 for all of the mesh connections to complete, in block 462, the MCU connection is disconnected and the WebRTC API is instructed to place each separate video image in its associated window in the HTML5 file. The task may then proceed in block 464 to block 430 of FIG. 4A.

The above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method, comprising:
receiving, by a mesh conferencing system endpoint, a virtual meeting room state table indicating one or more mesh conferencing system endpoints that are currently mesh connected to a videoconferencing session;
evaluating, by the mesh conferencing system endpoint, the virtual meeting room state table with a list of rules;
inviting, by the mesh conferencing system endpoint, a multipoint control unit to join the videoconferencing session as a mesh conferencing participant responsive to the evaluation, wherein operation of the multipoint control unit is controlled by a control module of the multipoint control unit that is configured to evaluate one or more escalation rules and convert a legacy videoconference or media relay videoconference to a mesh videoconference responsive to the evaluation;
sending a compressed media stream to the multipoint control unit; and
receiving from the multipoint control unit a stream of compressed media containing media received from one or more of the one or more mesh conferencing system endpoints.

2. The method of claim 1, wherein the virtual meeting room state table is received by a browser application, executed by a processor of a mesh conferencing system endpoint, configured to include an application program interface for a mesh-web client.

3. The method of claim 2, wherein the application programming interface is a web real-time communications application program interface.

4. The method of claim 1, wherein a rule of the list of rules causes inviting the multipoint control unit to join the videoconferencing session when the number of mesh conferencing system endpoints that participate in the videoconferencing session exceeds a threshold value.

5. The method of claim 4, wherein the threshold value is configurable.

6. The method of claim 4 wherein threshold value is in the range of 3 to 6 participants.

7. The method of claim 1, wherein the multipoint control unit is configured to connect a media relay endpoint to the videoconferencing session.

8. A multipoint control unit comprising:
a mesh conferencing system endpoint interface module, configured to:
receive an invitation from a mesh conferencing system endpoint inviting the multipoint control unit to join a videoconferencing session as a mesh conferencing participant;
receive compressed audio and compressed video from a plurality of mesh conferencing system endpoints participating in the videoconferencing session; and
deliver to each of the mesh conferencing system endpoints a stream of compressed video containing video images received from one or more of the plurality of mesh conferencing system endpoints;
an audio module;
a video module; and
a control module for controlling operation of the multipoint control unit, comprising:
an escalation module, configured to:
evaluate one or more escalation rules; and
convert a legacy videoconference or a media relay videoconference to a mesh videoconference, responsive to the evaluation.

9. The multipoint control unit of claim 8, wherein the mesh conferencing system endpoint interface module is further configured to:
receive decoded mixed audio from the audio module and a decoded continuous presence video image from the video module;
compress the decoded mixed audio and the decoded continuous presence video image; and
deliver the compressed mixed audio and the compressed continuous presence video image to another mesh conferencing system endpoint.

10. The multipoint control unit of claim 8, further comprising:
a media relay endpoint interface module, configured to:
receive a plurality of compressed audio and compressed video streams from a plurality of media relay endpoints participating in a videoconferencing session; and
deliver to each of the plurality of media relay endpoints compressed mixed audio and compressed continuous presence video streams,
wherein the compressed mixed audio and compressed continuous presence video comprise audio and video data received from one or more mesh conferencing system endpoints participating in the videoconferencing session.

11. The multipoint control unit of claim 8, further comprising:
a legacy conferencing endpoint interface module, configured to:
receive a plurality of compressed audio and compressed video streams from a plurality of legacy endpoints participating in a videoconferencing session;
receive mixed audio from the audio module and a continuous presence video image from the video module;
compress the mixed audio and the continuous presence video image; and
deliver the compressed mixed audio and the compressed continuous presence video image to the plurality of legacy endpoints,
wherein the compressed mixed audio and compressed continuous presence video comprise audio and video data received from one or more mesh conferencing system endpoints participating in the videoconferencing session.

12. The multipoint control unit of claim 8, where an escalation rule of the one or more escalation rules defines a maximum number of participants in a mesh videoconference.

13. The multipoint control unit of claim 8, where an escalation rule of the one or more escalation rules defines a threshold number of participants for deciding when to convert from a media relay or legacy videoconference to a mesh videoconference.

14. A non-transitory machine readable medium on which are stored instructions, comprising instructions that when executed cause a processor of a mesh conferencing system endpoint to:
evaluate one or more rules for converting a videoconference from one type of videoconference to another type of videoconference;
invite, based on evaluating the one or more rules, a multipoint control unit to join the videoconference as a mesh videoconferencing participant, wherein operation of the multipoint control unit is controlled by a control module of the multipoint control unit that is configured to evaluate one or more escalation rules and convert a legacy videoconference or media relay videoconference to a mesh videoconference responsive to the evaluation;
send a compressed media stream to the multipoint control unit; and
receive from the multipoint control unit a stream of compressed media containing media received from one or more other mesh conferencing system endpoints of the videoconference.

15. The machine readable medium of claim 14, wherein the one or more rules comprise a rule based on a number of participants in the videoconference.

16. The machine readable medium of claim 14, wherein the one or more rules comprise a rule based on whether the multipoint control unit is active in the videoconference.

17. The machine readable medium of claim 14, wherein the one or more rules comprise a rule based on codecs in use by participants in the videoconference.

* * * * *